(12) United States Patent
Lim

(10) Patent No.: US 7,123,047 B2
(45) Date of Patent: Oct. 17, 2006

(54) DYNAMIC ON-DIE TERMINATION MANAGEMENT

(75) Inventor: Kok Leng Lim, Penang (MY)

(73) Assignee: Intel Corporation, Santa Clara, CA (US)

(*) Notice: Subject to any disclaimer, the term of this patent is extended or adjusted under 35 U.S.C. 154(b) by 93 days.

(21) Appl. No.: 10/921,665

(22) Filed: Aug. 18, 2004

(65) Prior Publication Data

US 2006/0038583 A1    Feb. 23, 2006

(51) Int. Cl.
H03K 17/16    (2006.01)

(52) U.S. Cl. .................. 326/30; 326/26; 365/206

(58) Field of Classification Search ........... 326/26, 326/27, 30, 82, 83; 365/233, 206
See application file for complete search history.

(56) References Cited

U.S. PATENT DOCUMENTS

| | | | |
|---|---|---|---|
| 5,528,168 A | 6/1996 | Kleveland | |
| 5,825,691 A * | 10/1998 | McClure | 365/189.01 |
| 6,026,465 A | 2/2000 | Mills et al. | |
| 6,381,684 B1 | 4/2002 | Hronik et al. | |
| 6,411,122 B1 | 6/2002 | Mughal et al. | |
| 6,437,600 B1 * | 8/2002 | Keeth | 326/86 |
| 6,862,249 B1 * | 3/2005 | Kyung | 365/233 |
| 6,888,370 B1 * | 5/2005 | Luo et al. | 326/30 |
| 6,894,946 B1 * | 5/2005 | Jang | 365/233 |
| 6,970,369 B1 * | 11/2005 | Funaba et al. | 365/63 |
| 6,981,089 B1 * | 12/2005 | Dodd et al. | 710/308 |

OTHER PUBLICATIONS

"1M×36-bit, 2M×18-bit QDR™ SRAM Technical Note," User Guide for QDRII as QDRI, 36Mb QDRI 2Burst B-die, Jun. 2003, Rev. 0.0, pp. 1-20.

* cited by examiner

Primary Examiner—Don Le
(74) Attorney, Agent, or Firm—Schwabe, Williamson & Wyatt, P.C.

(57) ABSTRACT

A dynamic on-die termination circuit for a read-only node is disclosed herein.

23 Claims, 3 Drawing Sheets

DYNAMIC ON-DIE TERMINATION MANAGEMENT

FIELD

Disclosed embodiments of the present invention relate to integrated circuits, and more particularly to integrated circuits with dynamic on-die termination management at a read-only node.

BACKGROUND

Operating frequencies of processors are progressively increasing. In order to take advantage of these high frequencies, computer systems attempt to transmit signals along their buses and between system components at comparable frequencies.

When transmitting and receiving data at high frequencies between system components, such as between integrated circuits, some difficulties are encountered. Buses behave like transmission lines, where impedance mismatches lead to signal reflection and interference effects, such as ring-backs and overshoots. Maintaining signal quality over interconnections thus typically require termination of transmission lines (e.g., buses) with matching impedances to minimize signal reflections.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION OF EMBODIMENTS OF THE INVENTION

A method, apparatus, and system for dynamically enabling an on-die termination circuit is disclosed herein. In the following detailed description, reference is made to the accompanying drawings, which form a part hereof wherein like numerals designate like parts throughout. The drawings may show, by way of illustration, specific embodiments in which the invention may be practiced. It is to be understood that other embodiments may be utilized and structural or logical changes may be made without departing from the scope of the embodiments of the present invention. It should also be noted that directions and references (e.g., up, down, top, bottom, etc.) may be used to facilitate the discussion of the drawings but are not intended to restrict the application of the embodiments of this invention. Therefore, the following detailed description is not to be taken in a limiting sense and the scope of the embodiments of the present invention are defined by the appended claims and their equivalents.

Figure 1:
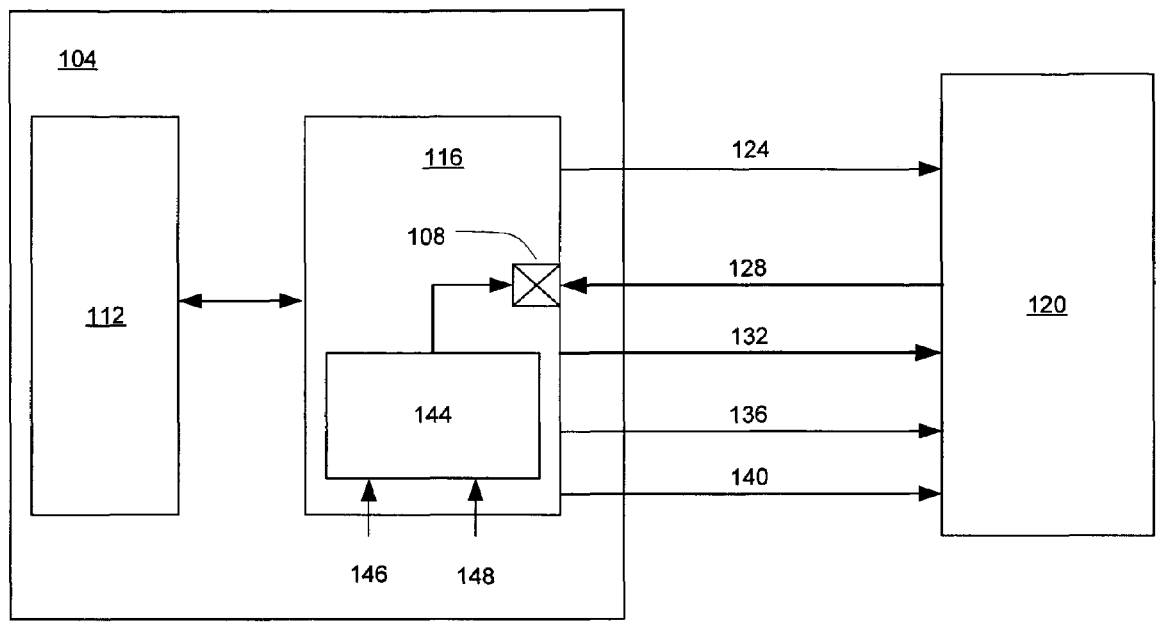
FIG. 1 illustrates an integrated circuit having a dynamic on-die termination circuit, in accordance with an embodiment of the present invention.

FIG. 1 illustrates an integrated circuit (IC) 104 having a dynamic on-die termination (ODT) circuit 108, in accordance with an embodiment of the present invention. The IC 104 may include an input/output (I/O) controller 112 and an I/O interface 116 to facilitate communication between the IC 104 and another IC 120. In particular, the I/O interface 116 may facilitate the transmission of a number of signals to and/or from the IC 120 over, e.g., a clock bus 124, a data-in bus 128 (relative to IC 104), a data-out bus 132, an address bus 136, and a control bus 140. In various embodiments, these buses may be separate or combined with one another. For example, in one embodiment the address bus 136 and the data bus 132 may be part of a larger bus. Examples of the integrated circuits 104 and 120 may include, but are not limited to, chipsets, input/output buffers, network cards, processors, coprocessors, and memories.

In one embodiment the I/O controller 112 may be a memory controller and the IC 120 may be memory, e.g., static random access memory (SRAM). In this embodiment, the memory may be adapted to transfer read data to the IC 104 along the data-in bus 128 and to receive write data along the separate data-out bus 132. An embodiment capable of dual data rate transfers along each of the unidirectional buses 128 and 132, i.e., able to transfer data on both the rising and falling edges a clock signal, may be capable of a total of four data transfers per clock pulse. A memory capable of these types of transfers may be referred to as a quad data rate (QDR) memory, e.g., a QDR SRAM. Other embodiments may include other components communicating at a quad data rate, e.g., a host processor and a coprocessor.

In one embodiment, the I/O controller 112 may include High Speed Transceiver Logic (HSTL) as an interface standard. Other I/O standards that the I/O controller 112 may employ include, but are not limited to, Gunning Transceiver Logic (GTL)/GTL+, Stubs Series Transceiver Logic (SSTL), and Low Voltage TTL (LVTTL).

In one embodiment, a pulse or signal traveling along the data-in bus 128 may cause reflections due to inconsistencies in the transmission lines at, for example, a read-only node where the bus 128 is coupled to the I/O interface 116. These reflections may travel back along the bus 128 and interfere with other traffic. In order to assuage this interference a termination impedance may be provided to the read-only node to absorb at least a portion of the signaling voltage so that it is not reflected.

During operation there may be periods of time where the data-in bus 128 is not transmitting data and therefore may not need termination impedance. In one embodiment, a termination control circuit 144 may be coupled to the ODT circuit 108 in order to dynamically enable the ODT circuit 108 based on anticipated/actual need. The termination control circuit 144 may include a wide variety of logic in order to determine whether or not to enable the ODT circuit 108. Disabling the ODT circuit 108 when data is not being received may provide board-level power savings by at least reducing the amount of direct current dissipated by the ODT circuit 108.

In one embodiment, the termination control circuit 144 may be coupled to receive a clock signal 146 and a read control signal 148 from the I/O controller 112. In one embodiment, the termination control circuit 144 may enable/disable the ODT circuit 108 based at least in part on when a read is asserted. The enable and disable states of the ODT circuit 108 may correspond to active and power-conservation states. For example, in one embodiment when the termination control circuit 144 disables the ODT circuit 108 it may simply disable a portion of the circuit to facilitate power-conservation, and not necessarily the entire circuit. This will be explained further below.

As depicted, the termination control circuit 144 is a part of the input/output interface 116; however, this is not necessarily the case in other embodiments. That is, in various embodiments the termination control circuitry 144 may be located in the I/O controller 112 or in other parts of the IC 104.

Figure 2:
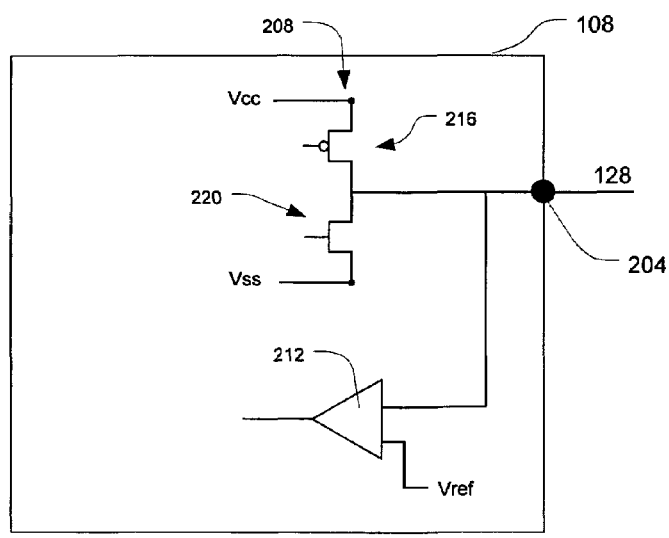
FIG. 2 illustrates the on-die termination circuit, in accordance with an embodiment of the present invention.

FIG. 2 illustrates the on-die termination circuit 108, in accordance with an embodiment of the present invention. In this embodiment the data in bus 128 may be coupled to a read-only node 204. The read-only node 204 may be coupled to a node of a complementary metal oxide semiconductor (CMOS) channel 208 and to a receiver 212, such as a differential amplifier. The CMOS channel 208 may include a p-type and an n-type field effect transistor (FET) 216 and 220 to facilitate in providing a termination impedance to the node 204. FET as used herein, may refer to metal oxide semiconductor field effect transistors (MOSFETs). These transistors may also be known as insulated gate field effect transistors (IGEETs).

In one embodiment, the gates of the FETs may be coupled to the termination control circuit 144. In one embodiment, the termination control circuit 144 may disable the on-die termination circuit 108 by deactivating both the p-type FET 216 and n-type FET 220. This may at least facilitate power conservation by preventing at least a portion of the current from dissipating while the node 204 does not need a termination impedance.

While the node is not receiving valid data it may be floating, e.g., receiving noise that could potentially cause the receiver 212 to toggle. Therefore, in one embodiment the ODT circuit 108 may be disabled by deactivating only the p-type FET 216, while the n-type FET 220 remains active. This may provide the node 204 with the Vss voltage, which may prevent the receiver 212 from toggling due to the noise on the line.

In one embodiment, the termination control circuit 144 may enable the ODT circuit 108 by activating both the p-type and the n-type FETs 216 and 220 in order to provide a termination impedance to the node 204. In various embodiments, a number of CMOS channels, similar to the channel 208 may be added in order to provide a matching impedance to the node 204. The FETs may be individually controlled in order to provide a desired impedance of a particular embodiment.

Figure 3:
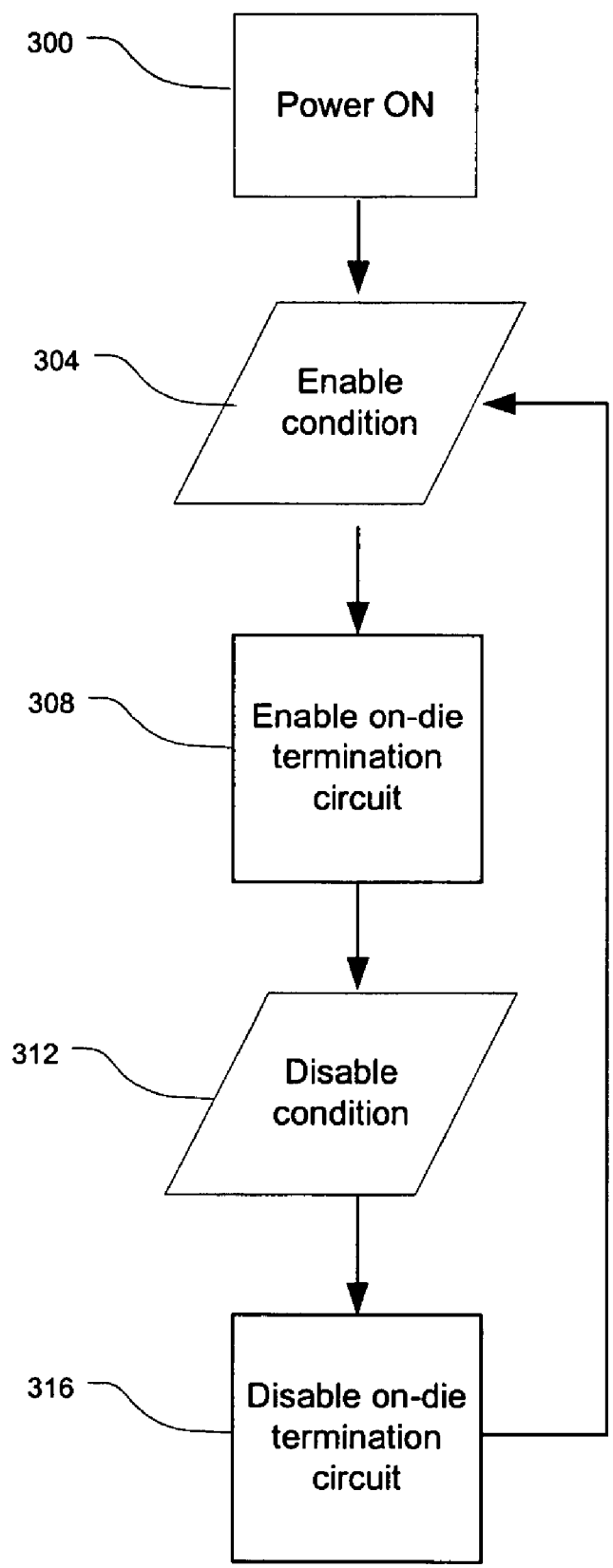
FIG. 3 illustrates a methodology of dynamically controlling an on-die termination circuit, in accordance with an embodiment of the present invention.

Referring to FIG. 3, there is illustrated a methodology of dynamically controlling an on-die termination circuit, in accordance with an embodiment of the present invention. In this embodiment, at a system power-on event 300 the ODT circuit may be initialized in a power-conservation state, or disabled. Upon the occurrence of a predetermined enable-condition 304, a termination control circuit may enable the ODT circuit 308. The ODT circuit may remain enabled until a disable-condition 312 occurs at which point the termination control circuit may disable the ODT circuit 316.

In one embodiment, the enable-condition 304 may be when the termination control circuit receives an asserted read. In this embodiment, the corresponding disable-condition 312 may occur after a period of time that it takes to execute the data retrieval associated with the read. This may be related to the burst mode, i.e., how many data words are retrieved for each read that is asserted. For example, in an embodiment where a read of a memory occurs at 2-bit burst dual data rate, each asserted read may cause, for example, two data words to be accessed during one fetch. Therefore, in this embodiment, the ODT circuit may be enabled for at least the number of clock pulses that it takes to access these two data words, along with any latencies or other delays. In this embodiment, the termination control circuit 144 may update the ODT activation by sending enable control signals upon the occurrence of subsequent enable-conditions.

In another embodiment, the disable-condition 312 may be a read not being asserted for a certain number of clocks. In various embodiments, the enable/disable conditions may be any of a number of triggering events.

Figure 4:
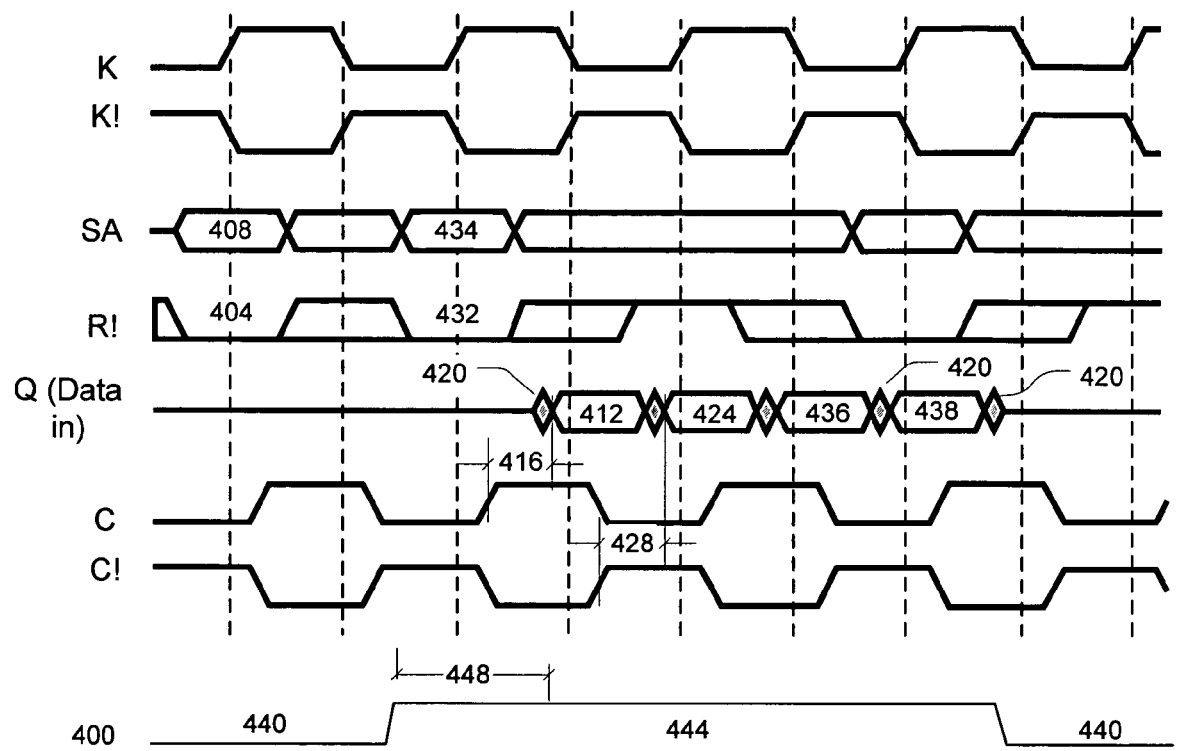
FIG. 4 illustrates timing waveforms of a read operation and associated on-die termination circuit state, in accordance with an embodiment of the present invention.

Referring now to FIG. 4 and also to FIG. 1, there is depicted timing waveforms of a read operation and associated ODT circuit state, in accordance with an embodiment of the present invention. In this embodiment, the I/O controller 112 may be a memory controller and the integrated circuit device 120 may be a memory adapted to communicate with the I/O controller 112 at a quad data rate. In this embodiment there may be a number of clock signals including, for example, a positive input clock K, a negative input clock K!, a positive output clock C, and a negative output clock C!. In various embodiments, there may also be one or more echo clocks. This embodiment may also include a read control signal R!, an address signal SA, and a data-in signal Q. Additionally, this embodiment depicts a timing waveform 400 indicating the status of the ODT circuit 108.

In one embodiment, the read control signal R! may assert a read 404 (asserted low) at the rising edge of the positive input clock K. A corresponding data address 408 may be presented and stored in a read address register of the memory device. In an embodiment having a 2-bit burst DDR operation, as discussed above, each asserted read may cause two data words to be accessed at a time. In this embodiment, the first data word 412 may be transferred out of the memory triggered by the first rising edge of the positive output clock C following the next positive input clock K rising edge after the read command 404. There may, however, be some latency 416 of the actual transfer of the data word 412, including a period of undefined data 420 preceding the actual data word 412. In this embodiment, the transfer of the second data word 424 may be triggered by the rising edge of the following negative output clock C!, again with some latency 428 including undefined data 420. In this embodiment, a second read command 432 may be asserted along with a second data address 434, and the transfer of data words 436 and 438 may be done in a similar manner as above.

In one embodiment, the on-die termination circuit 108 may initially be in a power-conservation state 440. The termination control circuit 144, which may be coupled to receive the read signal R!, may generate an enable control signal to switch the on-die termination circuit 108 into the active state 444 when the read is asserted 404. In one embodiment, in order to provide an effective termination impedance to the incoming data, the on-die termination circuit 108 may need time to stabilize before the data arrives at the input/output interface 116. This wake-up time may be needed, for example, to charge the board traces and/or other components. In one embodiment, wake-up time 448 is provided to the on-die termination circuit 108 by the termination control circuit 144 receiving the asserted read 404 and generating the enable control signal prior the memory delivering the first data word 412 to the read-only node of the input/output interface 116. This may at least in part be due to the read signal reaching the termination control circuit 144, which is on the same die as the I/O controller 112, prior to its reaching the external memory.

Figure 5:
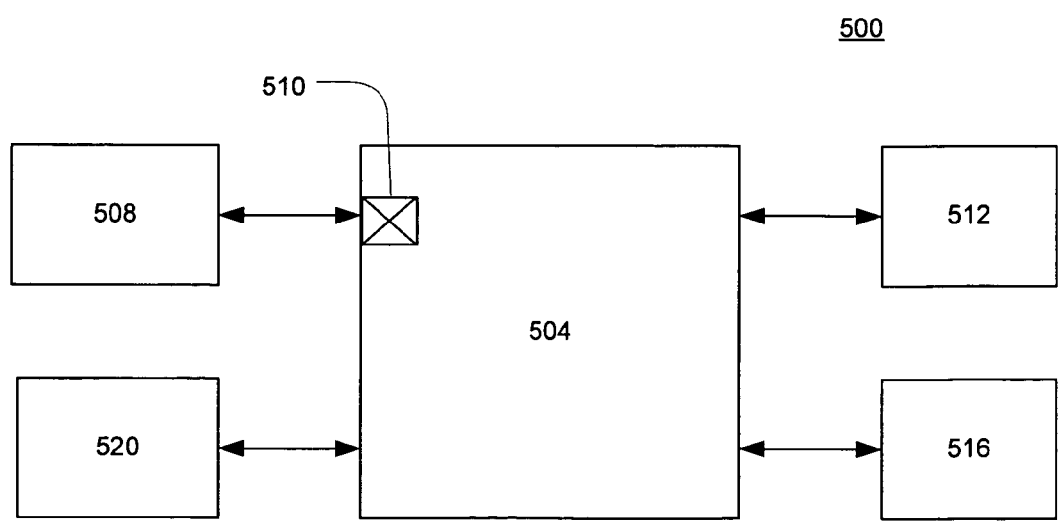
FIG. 5 illustrates a system including an on-die termination circuit, in accordance with an embodiment of the present invention.

FIG. 5 illustrates an example communication system 500, in accordance with one embodiment. As illustrated, the communication system 500 may include a processing node 504, an external or off-die memory 508, an additional processing node 512, a networking interface 516, and a peripheral interface 520, coupled together as shown.

The processing node 504, which may be a network processor in one embodiment, may include an integrated circuit device similar to the integrated circuit device 104 discussed above. In one embodiment, the processing node 504 may interface with the memory 508 through separate read and write buses. In this embodiment, the processing node 504 may include a dynamic on-die termination circuit 510 coupled to a read-only node for the read bus, similar to the above discussion. In one such embodiment the memory 508 may include one or more QDR SRAM memory modules.

The external memory 508 may have, for example, data routing rules that the processing node 504 may use to facilitate communication and data routing through the network interface 516 and/or the peripheral interconnect interface 520. The data routing rules may be stored employing any one of a number of data structure techniques, including but are not limited to, e.g., tables, link lists, and so forth. The data may be received and forwarded in accordance with any one of a number of communication protocols, including but not limited to, Transmission Control Protocol/Internet Protocol (TCP/IP), Packet over Sonet (PoS), and asynchronous transfer mode (ATM). In various embodiments, the network interface 516 may be adapted to facilitate communication with networks having a number of different topologies, protocols, and architectures.

In various embodiments the peripheral interface 520 may be, for example, a fabric interface and/or a peripheral component interconnect (PCI) interface. The peripheral interface 520 may be used to facilitate communication with a wide variety of I/O devices including, but not limited to, storage devices, keyboards, cursor control devices, etc.

Examples of the additional processing node 512 may include, but are not limited to, a host central processing unit (CPU), a graphics coprocessor, an application specific integrated circuit (ASIC), and so forth. In various embodiments, the processing node 512 may be coupled to the processing node 504 in a manner similar to how processing node 504 is coupled to the external memory 508.

In various embodiments, the communication system 500 may be a media-center personal computer (PC), a wireless mobile phone, a personal digital assistant, a router, a switch, a gateway, a server, and so forth.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   an on-die termination circuit having a first and a second state, adapted to provide a termination impedance to a read-only node while in the first state; and
   a termination control circuit coupled to the on-die termination circuit and adapted to facilitate the on-die termination circuit in entering into the first state upon an occurrence of a first condition and the second state upon an occurrence of a second condition.

2. The apparatus of claim 1, wherein the termination control circuit is further coupled to receive an asserted read signal to indicate an impending receipt of data at the read-only node, and the first condition is the receipt of the asserted read signal by the termination control circuit.

3. The apparatus of claim 2, wherein the termination control circuit is coupled to receive a clock signal including a plurality of clock pulses.

4. The apparatus of claim 3, wherein the second condition is the termination control circuit receiving a predetermined number of clock pulses after the receipt of the asserted read signal.

5. The apparatus of claim 1, further comprising:
   an input/output interface including the on-die termination circuit and the termination control circuit; and
   a memory controller, coupled to the input/output interface and adapted to transmit the asserted read signal to the termination control circuit.

6. The apparatus of claim 5, wherein the input/output interface is adapted to be coupled with an external memory.

7. The apparatus of claim 6, wherein the external memory comprises a static random access memory.

8. The apparatus of claim 6, wherein the input/output interface is adapted to communicate with the external memory at a quad data rate.

9. The apparatus of claim 1, wherein the read-only node is adapted to be coupled with a bus having a characteristic impedance and the termination impedance is approximately equivalent to the characteristic impedance of the bus.

10. The apparatus of claim 1, wherein the on-die termination circuit further comprises a complementary metal oxide semiconductor channel coupled to provide the termination impedance to the read-only node.

11. A method comprising:
    operating a memory controller adapted to transmit data to and from an external memory through an input/output interface; and
    controlling an on-die termination circuit to be in a first state to provide a termination impedance to a read-only node of the input/output interface, said controlling done upon the occurrence of a first condition.

12. The method of claim 11, wherein the controlling of the on-die termination circuit to be in the first state includes a termination control circuit:
    receiving an asserted read signal that indicates an impending receipt of data at the read-only node; and
    generating a control signal upon the receipt of the asserted read signal to control the on-die termination circuit to be in the first state.

13. The method of claim 11, wherein the on-die termination circuit further comprises a second state, and the controlling further comprises controlling, upon an occurrence of the second condition, the on-die termination circuit to be in the second state.

14. method of claim 13, wherein the controlling of the on-die termination circuit to be in the second state upon an occurrence of the second condition includes a termination control circuit:
- receiving an asserted read signal that indicates an impending receipt of data at the read-only node;
- receiving a clock signal including a plurality of clock pulses; and
- generating a control signal, upon the receipt of a predetermined number of clocks after the receipt of the asserted read signal, to control the on-die termination circuit to be in the second state.

15. The method of claim 11, wherein the memory controller is adapted to transmit data to and from an external memory at a quad data rate.

16. The method of claim 15, wherein the external memory includes a static random access memory.

17. A system comprising:
- a processing node, having
    - an on-die termination circuit with a first and a second state, adapted to provide a termination impedance to a read-only node while in the first state, and
    - a termination control circuit coupled to the on-die termination circuit and adapted to facilitate the on-die termination circuit in entering into the first state upon an occurrence of a first condition and the second state upon an occurrence of a second condition; and
- an external memory, coupled to receive an asserted read signal from the processing node and adapted to transmit data over a bus coupled to the read-only node in response to the asserted read signal.

18. The system of claim 17, wherein the termination control circuit is further coupled to receive the asserted read signal, and the first condition is the receipt of the asserted read signal by the termination control circuit.

19. The system of claim 18, wherein the termination control circuit is coupled to receive a clock signal including a plurality of clock pulses, and the receipt of a predetermined number of clock pulses following the receipt of an asserted read signal.

20. The system of claim 17, wherein the external memory comprises quad data rate (QDR) static random access memory (SRAM).

21. The system of claim 17, wherein the processing node comprises a network processor.

22. The system of claim 21, further comprising:
- a network interface, coupled to the processing node, to facilitate communication of network data between a network and the processing node.

23. The system of claim 22, wherein the external memory includes a plurality of data routing rules, and the processing node is adapted to route the network data based at least in part on the data routing rules.

* * * * *